(No Model.)
H. M. PIERCE.
Protective Cushion for Steam Boilers, &c.
No. 237,997. Patented Feb. 22, 1881.
FIG. I.
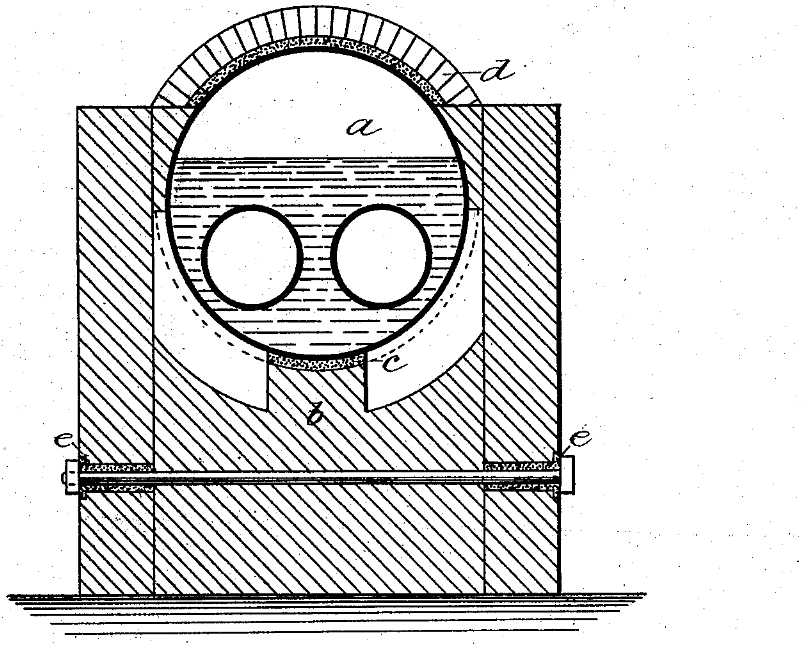
FIG. II.
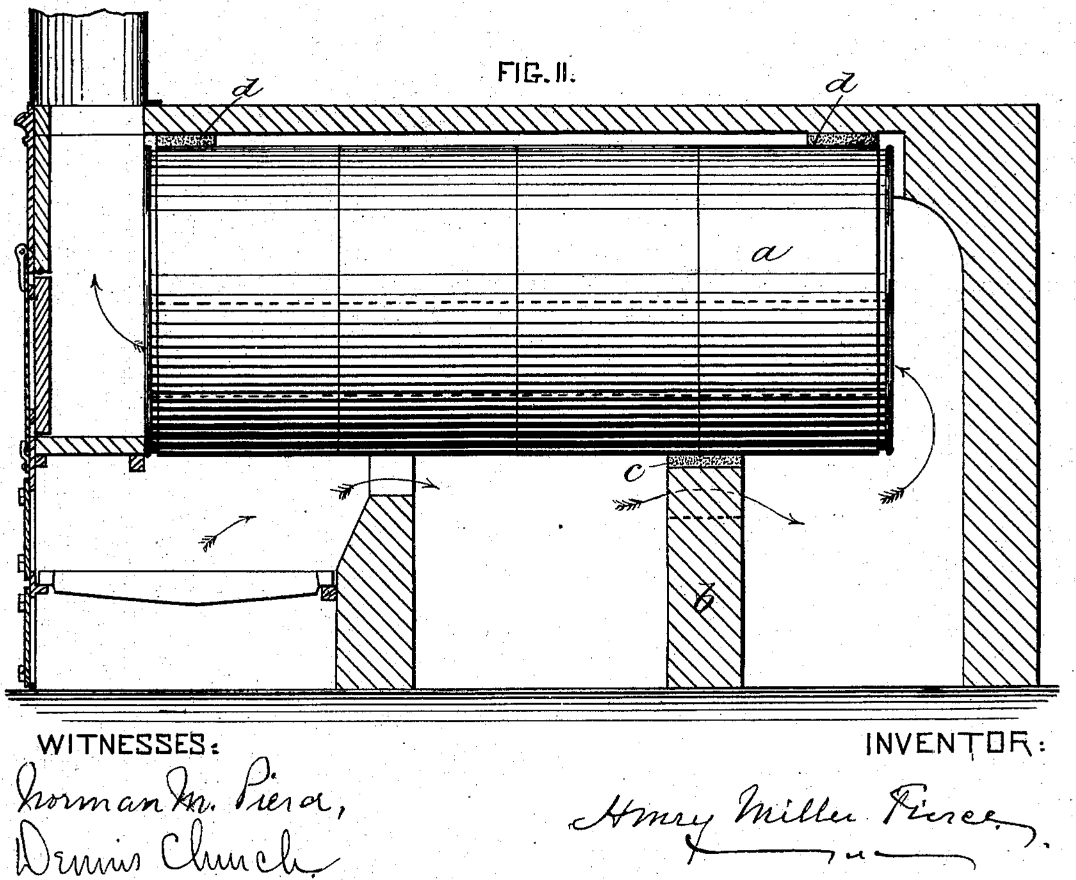
WITNESSES:
Norman M. Pierce,
Dennis Church
INVENTOR:
Henry Miller Pierce.
N. PETERS, PHOTO-LITHOGRAPHER, WASHINGTON, D. C.

UNITED STATES PATENT OFFICE.

HENRY M. PIERCE, OF GRAND RAPIDS, MICHIGAN.

PROTECTIVE CUSHION FOR STEAM-BOILERS, &c.

SPECIFICATION forming part of Letters Patent No. 237,997, dated February 22, 1881.

Application filed July 27, 1880. (No model.)

*To all whom it may concern:*

Be it known that I, HENRY MILLER PIERCE, a citizen of the United States residing at Grand Rapids, in the county of Kent and State of Michigan, have invented certain new and useful Improvements in Protective Cushions for Steam-Boilers and other Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the drawings, Figure 1 is a transverse section, and Fig. 2 a longitudinal section, of a steam-boiler and its furnace, illustrating the application of my invention.

Like letters refer to like parts wherever they occur.

This invention is applicable not only to the setting of steam-boilers, but for various constructions wherein metal and fire-brick or other refractory material are necessarily brought in contact and exposed to high temperatures, as in the case of evaporating-pans, superheaters, gas-retorts, the metal bars, plates, stay-bolts, beams, &c., used in the construction of furnaces generally; and therefore, because I have chosen for purposes of illustration what I deem to be its most valuable application, I do not expect or intend to limit my invention thereto.

In the setting of steam-boilers, the construction of furnaces, &c., where the metal-work is supported by or comes in contact with the fire-brick walls or other refractory material composing the structure, there is a constant tendency to destruction of the parts, due to the unequal heating and expansion of the metal and the resistance of the refractory material, which forces tend to warp, wear, strain, and destroy the metal, as well as to cause the displacement and rupture of the furnace-walls.

The object, therefore, of my invention is to provide a means which will not only prevent the unequal heating and expansion of the metal, but will relieve the brick-work of the thrust due to the expansion of the metal.

To this end it consists in the interposition of a layer, cushion, or pad of non-combustible, yielding, or compressible material between the iron and brick-work of furnaces, boilers, evaporators, and like structures. For this purpose asbestus or a similar substance may be employed, asbestus being preferred by me because it is readily obtained, can be reduced to a fibrous or flocculent state, and, being a poor conductor of heat, insures equal heating and expansion of the metal. In some cases, where not exposed to the direct action of flame or to great heat, the substance produced by treating molten slag with a steam-blast, sometimes termed "mineral wool" or "mineral cotton," may be used.

I will now proceed to describe my invention more specifically, so that others skilled in the art to which it appertains may apply the same.

In the setting of boilers, evaporating-pans, or like devices, I interpose between the metal boiler-shell *a* and the brick-work *b*, wherever the same come in contact, a cushion, pad, or packing, *c*, of asbestus. If, as in the case of some boilers, the metal is inclosed by an arch of brick-work, the cushion or pad will also be interposed between the brick arch and the top of the boiler, as at *d*, and will then have a double function—first, as a protective cushion or packing, and, secondly, as a non-conducting covering.

In case of the stay-bolts and other parts of furnaces the cushion may be arranged as at *e*, or in other suitable manner which will suggest itself to the skilled mechanic or builder. This cushion or layer of asbestus should be sufficiently thick to allow of its yielding under the expansion of the metal, and should be so secured in position as to prevent its displacement by the expansion of the metal or from other causes. I prefer to reduce the asbestus to a fibrous or flocculent condition and form a felt thereof as the best manner of securing the desired result, though the asbestus may be used in the form of wool without felting it.

The advantages arising from the interposition of the layer or cushion between the metal and brick-work are, first, that there is no unequal distribution of heat, for the cushion not only prevents the conduction of excessive heat to the metal, but it also prevents the conduction of heat from the metal to the wall; secondly, the cushion, being elastic or yielding, permits of the sliding of the metal due to expansion without giving rise to such friction as would injure the metal; and, thirdly, the yielding of the cushion relieves the walls from all strain or thrusts which would tend to displace or destroy the same.

Having thus described my invention, what I claim, and desire to secure by Letters Patent, is—

In the construction of furnaces, setting of boilers, evaporating-pans, &c., the combination, with the metal and brick-work, of an interposed cushion or pad of yielding non-combustible material, substantially as and for the purpose specified.

In testimony whereof I affix my signature in presence of two witnesses.

HENRY MILLER PIERCE.

Witnesses:
NORMAN M. PIERCE,
DENNIS CHURCH.